(12) United States Patent
Fink et al.

(10) Patent No.: US 7,656,748 B2
(45) Date of Patent: Feb. 2, 2010

(54) METHOD OF DETERMINING IMPULSE RESPONSES FROM A MEDIUM IN RELATION TO THE TRANSMISSION OF WAVES BETWEEN DIFFERENT POINTS

(75) Inventors: Matthias Fink, Meudon (FR); Julien De la Gorgue de Rosny, Paris (FR); Claire Julia-Prada, Paris (FR); Thomas Folegot, Brest (FR)

(73) Assignees: Centre National de la Recherche Scientifique, Paris Cedex (FR); Universite Paris 7 - Denis Diderot, Paris Cedex (FR)

( * ) Notice: Subject to any disclaimer, the term of this patent is extended or adjusted under 35 U.S.C. 154(b) by 0 days.

(21) Appl. No.: 10/550,429

(22) PCT Filed: Mar. 19, 2004

(86) PCT No.: PCT/FR2004/000684

§ 371 (c)(1),
(2), (4) Date: Sep. 21, 2005

(87) PCT Pub. No.: WO2004/086557

PCT Pub. Date: Oct. 7, 2004

(65) Prior Publication Data

US 2006/0187754 A1    Aug. 24, 2006

(30) Foreign Application Priority Data

Mar. 24, 2003 (FR) .................................. 03 03545

(51) Int. Cl.
*G01V 1/24* (2006.01)
(52) U.S. Cl. ............................ 367/40; 367/38; 367/41; 324/323

(58) Field of Classification Search .................... 367/25, 367/38, 138, 40, 41; 324/323, 337
See application file for complete search history.

(56) References Cited

U.S. PATENT DOCUMENTS

| 3,885,225 | A | * | 5/1975 | Anstey et al. | .................. 367/41 |
|---|---|---|---|---|---|
| 4,167,879 | A | | 9/1979 | Pedersen | |
| 4,456,982 | A | | 6/1984 | Tournois | |

(Continued)

OTHER PUBLICATIONS

Miyashita, et al. "High Resolution Acoustic Impulse Response in Air with Spectral Extrapolation by Linear Prediction." 1998 IEEE Ultrasonics Symposium.*

(Continued)

*Primary Examiner*—Scott A Hughes
(74) *Attorney, Agent, or Firm*—Miller, Matthias & Hull

(57) ABSTRACT

The invention relates to a method of determining impulse responses from a medium (2) in relation to the transmission of waves between different points (T1-TN). The inventive method consists in: transmitting waves in the medium by generating, at each point j, signals ei(t) each comprising n elementary signals with respective frequencies which are spaced apart in pairs by an interval $\delta f$ and which are different from the frequencies of the elementary signals corresponding to the other points; receiving signals rj(t) at points j after the transmission of the aforementioned waves in the medium; and calculating each impulse response hij(t) from a correlation signal between signal ei(t) transmitted at point i and signal rj(t) received at point j.

15 Claims, 1 Drawing Sheet

U.S. PATENT DOCUMENTS

| | | | | |
|---|---|---|---|---|
| 4,715,020 A | * | 12/1987 | Landrum, Jr. | 367/38 |
| 4,823,326 A | * | 4/1989 | Ward | 367/41 |
| 5,696,737 A | * | 12/1997 | Hossack et al. | 367/138 |
| 5,721,710 A | * | 2/1998 | Sallas et al. | 367/41 |
| 6,138,512 A | * | 10/2000 | Roberts et al. | 73/570 |
| 6,161,076 A | * | 12/2000 | Barr et al. | 702/17 |
| 6,193,659 B1 | * | 2/2001 | Ramamurthy et al. | 600/443 |
| 6,226,228 B1 | * | 5/2001 | Hossack et al. | 367/138 |
| 6,813,566 B2 | * | 11/2004 | Hartley | 702/18 |

OTHER PUBLICATIONS

Panasik, et al. "Precide Impulse Response Measurement of Saw Filters." IEEE Transactions on Sonics and Ultrasonics, vol. SU-23, No. 4, Jul. 1976.*

Derode et al., "Taking Advantage of Multiple Scattering to Communicate with Time Reversal Antennas", Physical Review Letters 90 (1), pp. 014301-1-014301-4, 2003.

Prada and Fink, "Engenmodes of the Time Reversal Operator: a Solution to Selective Focusing in Multiple-Target Media", Wave Motion 20, pp. 151-163, 1994.

Mordant et al., "Highly resolved detection and selective focusing in a waveguide using the D.O.R.T. method", J. Acoust. Soc. Am. 105, 2634-2642, 1999.

Folegot et al., "3D Spatial Resolution Enhancement Through Environmental Effects with the Time Reversal Operator Decomposition", Oceans '02 MTS/IEEE, Biloxi, Oct. 2002.

Prada, et al., "Flaw Detection in Solid with the D.O.R.T. Method", IEEE Ultrasonics Symposium, pp. 679-683, 1997.

French Search Report FR 0303545; report dated Nov. 27, 2003.

International Search Report PCT/FR2004/000684; report dated Sep. 9, 2004.

* cited by examiner

METHOD OF DETERMINING IMPULSE RESPONSES FROM A MEDIUM IN RELATION TO THE TRANSMISSION OF WAVES BETWEEN DIFFERENT POINTS

CROSS-REFERENCE TO RELATED APPLICATION

This is the U.S. National Phase of International Application No. PCT/FR2004/000684 filed 19 Mar. 2004, the entire disclosure of which is incorporated herein by reference.

BACKGROUND OF THE INVENTION

The present invention concerns methods of determining impulse responses from a medium in relation to the transmission of waves between different points.

More particularly, the invention relates to a method of determining impulse responses of a medium in relation to the transmission of waves between different points, method comprising:

(a) at least one step of emission in the course of which waves are emitted into the medium by generating signals ei(t) on the basis of a number N of emission points belonging to the medium, where N is an integer at least equal to 2 and i is an index lying between 1 and N which designates one of said N emission points, (b) at least one step of reception in the course of which signals rj(t) are picked up from said waves after transmission in said medium, at a number M of reception points belonging to the medium (these reception points may be coincident with the emission points), where M is a non-zero natural integer and j is an index lying between 1 and M which designates one of said M reception points, (c) and at least one step of determination of said impulse responses hij (t) between each emission point i and each reception point j on the basis of the signals emitted ei(t) and picked up rj(t).

The impulse responses may be determined for the purposes of focusing waves in the medium, for example for the purposes of imaging the medium or of selective communication between various points of the medium, in particular within the framework of the implementation of the "D.O.R.T." procedure (Décomposition de l'Opérateur Retournement Temporel [Decomposition of the Time Reversal Operator]) described in particular by Prada et al., (C. Prada and M. Fink, "Eigenmodes of the time reversal operator: a solution to selective focusing in multiple-target media." *Wave Motion*, 20, pp 151-163 (1994)).

The process of acquisition of the impulse responses between the points in question of the medium is, however, relatively slow, insofar as it is performed sequentially, for the various emission points i one after the other, as described for example in the document WO-A-02/32 316 within the framework of a method of focusing of acoustic waves other than the abovementioned "D.O.R.T." procedure.

This slowness lengthens the time of implementation of the method, and when the medium is changeable, it does not make it possible to obtain the impulse responses quickly enough to be able to be used validly thereafter in this medium.

The present invention is aimed in particular at alleviating these drawbacks.

SUMMARY OF THE INVENTION

For this purpose, according to the invention, a method of the kind in question is characterized in that in the course of step (a), said N emission points are made to simultaneously emit the signals ei(t), these signals ei(t) having a duration T and each being a sum of n substantially monochromatic elementary signals, of like amplitude and of respective frequencies $f_{0,i}+k.\delta f$, where $f_{0,i}$ is a predetermined eigenfrequency at the point i, k is an integer lying between 0 and n, n is an integer at least equal to 2 and $\delta f$ is a predetermined frequency interval, the respective eigenfrequencies $f_{0,i}$ at the various points i being distinct from one another and lying in a frequency band of width $\delta f$, and in that in the course of step (c), each impulse response hij (t) is calculated on the basis of a signal of correlation between the signal ei(t) emitted at the point i and the signal rj(t) picked up at the point j.

By virtue of these provisions, the impulse responses between N emission points and M reception points (possibly coinciding with the emission points) are calculated simultaneously, thereby accelerating the process for acquiring the impulse responses.

In various modes of execution of the method according to the invention, recourse may possibly be had furthermore to one and/or other of the following provisions:

the respective eigenfrequencies $f_{0,i}$ at the various points i are separated pairwise by an offset $\delta f/N$;

in the course of step (c), said correlation signal is windowed by means of a gate function $\pi(t)$ of width $1/\delta f$;

in the course of step (c), the impulse responses hij(t) are determined through the formula:

$$hij(t) = \Pi(t) \int ei(\theta-t) \cdot rj(\theta) d\theta;$$

the waves transmitted in the medium between the emission points and the reception points are acoustic waves;

in the course of step (a), the medium where the waves are emitted is reverberant;

the frequency interval $\delta f$ is less than or equal to $1/\tau$, where $\tau$ is the temporal dispersion of the medium (that is to say the duration of the signal picked up after emission of an impulse signal into the medium);

the frequency interval $\delta f$ is substantially equal to $1/\tau$, where $\tau$ is the temporal dispersion of the medium;

the duration T is at least equal to $N/\delta f$;

the duration T is at least equal to $N.\tau$, where $\tau$ is the temporal dispersion of the medium;

the elementary signals exhibit random phases;

the waves are emitted with a certain passband, the frequencies f0i comprise a minimum frequency f0 and the number n is determined so that the frequency band lying between f0 and $f0+[(n+1).\delta f]$ substantially overlaps said passband;

the reception points are coincident with the emission points.

Other characteristics and advantages of the invention will become apparent in the course of the following description of two of its modes of execution, given by way of non-limiting example, with regard to the appended drawings.

DESCRIPTION OF PREFERRED EMBODIMENTS

Figure 1:
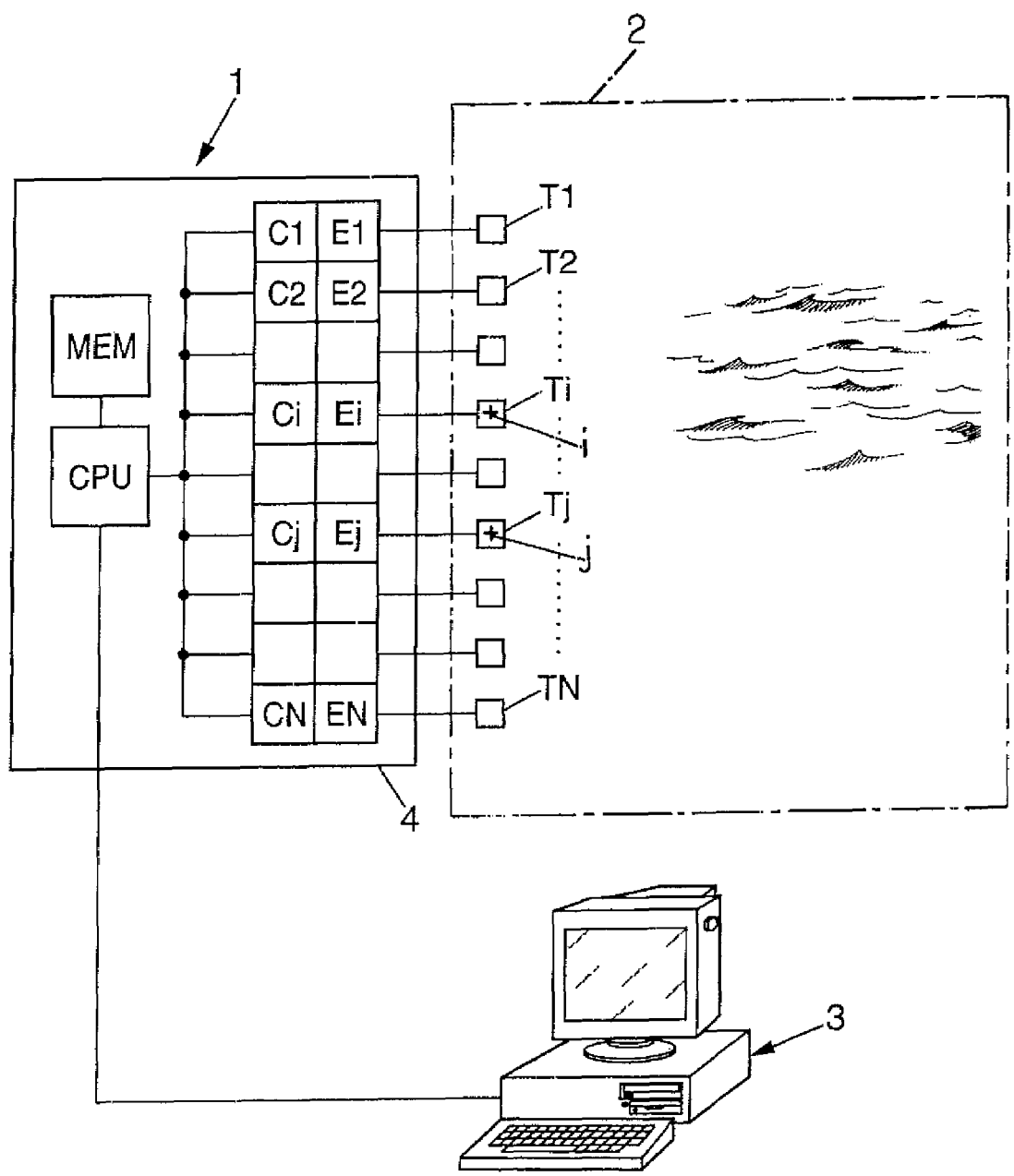
FIG. 1 is a diagrammatic view of a device suitable for implementing the present invention, in a mode of execution.

In the non-limiting example represented in the drawing, the method according to a mode of execution of the invention is implemented by a device 1 which is suitable for emitting and receiving waves in a medium 2, homogeneous or otherwise, generally reverberant, which may be solid, liquid or gaseous. The waves in question are preferably acoustic and the description hereinbelow will refer only to such acoustic waves, but said waves could possibly be of some other nature, for example of electromagnetic nature.

The device 1 comprises for example a computer 3, or any other similar control device, which controls the emissions of acoustic waves and the listening thereto in the medium 2. For this purpose, the computer 3 may for example control a dedicated electronic device 4 which may in particular comprise an electronic central unit CPU associated with a central memory MEM, this central unit CPU itself controlling N pathways (N being an integer at least equal to 2) each linked to a transducer T1-TN making it possible to emit and to pick up acoustic signals in the medium 2. All the pathways are synchronized with one another.

Each measurement pathway of the device 4 may comprise for example a sampler E1-EN linked to the corresponding transducer T1-TN, and each sampler may itself be linked to a memory associated with a central unit, referenced jointly C1-CN.

The device 1 may be used in particular for the purposes of imaging the medium 2, or else to establish a selective communication with a point of said medium, or the like, for example using the "D.O.R.T." procedure (Décomposition de l'Opérateur Retournement Temporel) described in particular by Prada et al., (C. Prada and M. Fink, "Eigenmodes of the time reversal operator: a solution to selective focusing in multiple-target media." *Wave Motion*, 20, pp 151-163 (1994)).

In all cases, it is necessary to determine the impulse responses between the transducers T1-TN.

For this purpose, the computer 3 controls the device 1 in such a way that it follows successively the following steps:

(a) at least one step of emission in the course of which waves are emitted into the medium by generating signals ei(t) on the basis of the N transducers T1-TN (these N transducers may as appropriate constitute only part of the transducers linked to the device 4, in which case the impulse responses pertaining to the whole set of transducers would be acquired in several successive passes, these passes nevertheless remaining much fewer in number than the total number of transducers), i being an index lying between 1 and N which designates one of said N transducers;

(b) at least one step of reception in the course of which the N transducers T1-TN pick up signals rj (t) from said waves after transmission in said medium, where j is an index lying between 1 and N designating one of said transducers;

(c) and at least one step of determination of said impulse responses hij (t) between each emission point i and each reception point j on the basis of the signals emitted ei(t) and picked up rj(t).

To make it possible to acquire in one go all the signals necessary for the determination of the impulse responses relating to the N abovementioned transducers (that is to say all or part of the transducers linked to the device 4, as explained hereinabove), all the signals ei(t) are emitted simultaneously in the course of step (a) by the N transducers, but these emitted signals are orthogonal to one another so that the information specific to each emission point may thereafter be separated from the other information in the signals picked up rj(t).

Thus, each emitted signal ei(t) is equal to the sum of n substantially monochromatic elementary signals, of like amplitude and of respective frequencies $f_{0,i}+k.\delta f$, where:

$f_{0,i}$ is a predetermined eigenfrequency specific to transducer i, k is an integer lying between 0 and n, n is an integer at least equal to 2, and $\delta f$ is a predetermined frequency interval, advantageously less than or equal to $1/\tau$ and preferably substantially equal to $1/\tau$, where $\tau$ is a mean value of the temporal dispersion of the medium 2, that is to say the duration of the signal picked up after emission of a pulsed signal (Dirac function) in the medium 2.

The respective eigenfrequencies $f_{0,i}$ specific to the various points i are distinct from one another and lie in a frequency band of width $\delta f$: advantageously these frequencies $f_{0,i}$ are separated pairwise by an offset $\delta f/N$.

Moreover, if BP is the passband with which the acoustic waves are emitted and received by the transducers, and if the lowest of the frequencies f0i is dubbed f0, then f0 and n may advantageously be determined so that the band of the frequencies of the elementary signals (band lying between f0 and $f0+[(n+1).\delta f]$) substantially overlaps said passband.

Advantageously, the elementary signals making up the signals ei(t) exhibit random phases.

All the signals ei(t) have the same duration T, which is advantageously at least equal to $N/\delta f$, and preferably at least equal to $N.\tau$.

In the course of step (c), each impulse response hij(t) is calculated on the basis of a signal of correlation between the signal ei(t) emitted at the point i and the signal rj(t) picked up at the point j.

In the example considered here, this correlation signal equals:

cij(t)=∫ei(θ).rj(t−θ)dθ (this integral is done for example over a duration at least equal to T, the start of which coincides with the start of the signal rj(t)).

Advantageously, this correlation signal is windowed by means of a gate function $\pi(t)$ of width $1/\delta f$ (which equals 1 during a period of $1/\delta f$ and 0 outside of this period), in which case the impulse responses hij(t) may advantageously be determined through the formula:

$$hij(t)=\Pi(t).cij(t).$$

It will be noted that, in the particular example represented in the drawing and described hereinabove, the reception points j at which the acoustic wave is picked up are coincident with the emission points and constituted by the transducers T1-TN, but the reception points in question may as appropriate be constituted by a second array of transducers (not represented), distinct from the array of transducers T1-TN.

In the general case, the acoustic waves which are generated by the emission of the signals ei(t) are therefore picked up at M reception points, M being a non-zero integer, which M reception points may either be coincident with the N emission points (in which case M=N), or not be completely coincident with the emission points, or be totally distinct from the emission points.

The invention claimed is:

1. A method of determining impulse responses of a medium in relation to the transmission of waves between different points, method comprising:

(a) at least one step of emission in the course of which waves are emitted into the medium by generating signals ei(t) on the basis of a number N of emission points included in the medium, where N is an integer at least equal to 2 and i is an index lying between 1 and N which designates one of said N emission points, the signals ei(t) being generated by N number of transducers;

(b) at least one step of reception in the course of which signals rj(t) are picked up from said waves after transmission in said medium, at a number M of reception points included in the medium, where M is a non-zero natural integer and j is an index lying between 1 and M which designates one of said M reception points, the signals rj(t) being picked up by N number of transducers;

(c) and at least one step of determination of said impulse responses hij(t) between each emission point i and each reception point j on the basis of the signals emitted ei(t) and picked up rj(t), the impulse responses hij(t) being determined by a control device connected to the transducers;

wherein during the course of step (a), said N emission points are made to simultaneously emit the signals ei(t), these signals ei(t) being orthogonally coded so as to be orthogonal to one another and such that the information specific to each emission point may thereafter be separated from the other information in the signals picked up rj(t), and having a duration T and each being a sum of n substantially monochromatic elementary signals, of like amplitude and of respective frequencies $f_{0,i}+k.\delta f$, where $f_{0,i}$ is a predetermined eigenfrequency at the point i, k is an integer lying between 0 and n, n is an integer at least equal to 2 and $\delta f$ is a predetermined frequency interval, the respective eigenfrequencies $f_{0,i}$ at the various points i being distinct and lying in a frequency band of width $\delta f$, the frequency $f_{0,i}$ for each signal ei(t) being different for the N emission points, and wherein during the course of step (c), each impulse response hij(t) is calculated on the basis of a signal of correlation between the signal ei(t) emitted at the point i and the signal rj(t) picked up at the point j.

2. The method as claimed in claim 1, in which the respective eigenfrequencies $f_{0,i}$ at the various points i are separated pairwise by an offset $\delta f/N$.

3. The method as claimed in claim 1, in which, in the course of step (c), said correlation signal is windowed by means of a gate function $\pi(t)$ of width $1/\delta f$.

4. The method as claimed in claim 3, in which, in the course of step (c), the impulse responses hij(t) are determined through the formula:

$$hij(t)=\Pi(t).\int ei(\theta-t).rj(\theta)d\theta.$$

5. The method as claimed in claim 1, in which the waves transmitted in the medium between the emission points and the reception points are acoustic waves.

6. The method as claimed in claim 1, in which, in the course of step (a), the medium where the waves are emitted is reverberant.

7. The method as claimed in claim 1, in which the frequency interval $\delta f$ is less than or equal to $1/\tau$, where $\tau$ is the temporal dispersion of the medium.

8. The method as claimed in claim 7, in which the frequency interval $\delta f$ is substantially equal to $1/\tau$, where $\tau$ is the temporal dispersion of the medium.

9. The method as claimed in claim 1, in which the duration T is at least equal to $N/\delta f$.

10. The method as claimed in claim 1, in which the duration T is at least equal to $N.\tau$, where $\tau$ is the temporal dispersion of the medium.

11. The method as claimed in claim 1, in which the elementary signals exhibit random phases.

12. The method as claimed in claim 1, in which the waves are emitted with a certain passband, the frequencies f0i comprise a minimum frequency f0 and the number n is determined so that the frequency band lying between f0 and $f0+[(n+1).\delta f]$ substantially overlaps said passband.

13. The method as claimed in claim 1, in which the reception points are coincident with the emission points.

14. The method of claim 1, wherein the N transducers are acoustic wave transducers.

15. The method of claim 1, wherein the N transducers are electromagnetic wave transducers.

* * * * *